US006565128B2

(12) United States Patent
Augustin

(10) Patent No.: US 6,565,128 B2
(45) Date of Patent: May 20, 2003

(54) DEVICE AND METHOD FOR COUPLING A FLUID RAIL WITH FUEL INJECTORS

(75) Inventor: Ulrich Augustin, Blythewood, SC (US)

(73) Assignee: Siemens Diesel Systems Technology, Blythewood, SC (US)

( * ) Notice: Subject to any disclaimer, the term of this patent is extended or adjusted under 35 U.S.C. 154(b) by 0 days.

(21) Appl. No.: 09/903,687

(22) Filed: Jul. 13, 2001

(65) Prior Publication Data

US 2003/0011193 A1 Jan. 16, 2003

(51) Int. Cl.[7] .............................................. F16L 27/12
(52) U.S. Cl. ......................... 285/302; 285/298; 285/31; 285/318
(58) Field of Search ............................ 285/302, 31, 32, 285/318, 298; 403/109.3, 109.7, 109.1

(56) References Cited

U.S. PATENT DOCUMENTS 1,321,154 A 11/1919 Sager
2,173,743 A 9/1939 Humason
2,476,777 A 7/1949 Smith
2,529,821 A 11/1950 Snider
2,533,097 A * 12/1950 Dale .......................... 285/302
4,290,484 A * 9/1981 Beall et al. ................. 166/242
4,576,218 A 3/1986 Artz et al.
4,776,617 A 10/1988 Sato
5,163,722 A 11/1992 Worden
5,365,907 A 11/1994 Dietrich et al.
5,394,850 A * 3/1995 Murphy et al. ............. 123/470
5,823,446 A 10/1998 Bennett et al.
6,056,329 A 5/2000 Kitani et al.
6,237,965 B1 * 5/2001 Kuo ........................ 285/145.3
6,257,625 B1 * 7/2001 Kitani et al. ................... 285/2

* cited by examiner

*Primary Examiner*—Lynne H. Browne
*Assistant Examiner*—G M Collins
(74) *Attorney, Agent, or Firm*—McGuireWoods LLP

(57) ABSTRACT

A device and a method for coupling a fluid rail to injectors by a connector, the connector having telescopic tube members extending between a first end and a second end, a sealing member disposed between a first tubular member and the fluid rail, a sealing member disposed between a second tubular member and the injector. The tubes are urged apart by either hydraulic pressure or by a resilient member to form a tight seal between the hemispherical distal ends of the connector to the respective fluid rail outlet and injector inlet. This invention also permits the coupling of a fluid rail to at least one fuel injector by providing a fluid rail, a flexible coupler on the injector inlet, mounting the nested or telescopic connector into both the flexible coupler and the injector inlet, inserting the fluid rail onto the connector and then urging the telescopic connector apart to form a tight seal against the inlet and the outlet.

22 Claims, 2 Drawing Sheets

DEVICE AND METHOD FOR COUPLING A FLUID RAIL WITH FUEL INJECTORS

FIELD OF THE INVENTION

This invention is directed to a device and a method for connecting a plurality of fuel injectors to a fluid rail.

BACKGROUND OF THE INVENTION

In a conventional high-pressure fuel injector arrangement, hydraulic fluid is pressurized to about 3000 p.s.i. (20.7 MPa) while fuel pressure is pressurized to around 60 p.s.i. (0.414 MPa). The hydraulic fluid is used to pressurize the pre-pressurized fuel inside the injector for injection into an engine. The pressurized hydraulic fluid is supplied to the injectors by what is commonly known as a "jumper tube" between a hydraulic fluid rail and each of the injectors. The injectors are then directly mounted to the cylinder head of the engine.

In the conventional arrangement, the cylinder head of an engine may have 1 to 2 millimeters of movement while operating. Because of this movement, leakage and vibration-induced cracks is believed to develop in the jumper tubes or the fluid rail. Additionally, there is believed to be a pressure loss between the fluid rail and the injector when using these jumper tubes.

Thus, there is a strong need to overcome these and other problems associated with the conventional fuel injector's fluid rail arrangement.

SUMMARY OF THE INVENTION

Accordingly, the present invention is directed to a device and a procedure to permit the mounting of the fuel injector to a hydraulic actuating fluid rail to overcome the disadvantages of the related art.

The present invention provides for a connector for communicating fluid between a fluid rail and a fuel injector, the connector comprising at least two tubular members adapted to be mounted telescopically, each tubular member having an interior surface facing an axis and an exterior surface, the tubular members defining distal ends, and at least one retaining member disposed between the tubular members and adapted to retain the tubular members in a preset configuration The present invention further provides for a system for communicating fluid between a fluid rail and an injector, the system comprising a fluid rail, an injector, at least two tubular members adapted to be mounted in a nested configuration, each tubular member being in fluid communication with the fluid rail and the injector, and at least one retaining member disposed between the tubular members and adapted to retain the tubular members in a preset configuration.

The present invention additionally provides for a method of transferring fluid between a fluid rail and a fuel injector by providing at least two tubular members disposed telescopically to each other, each tubular member having an interior surface facing an axis and an exterior surface, the tubular members defining distal ends, by retaining the tubular members in a preset configuration, by transferring hydraulic fluid between one distal end to the other distal end, and by urging the tubular members apart to couple to both the fluid rail and the injector.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
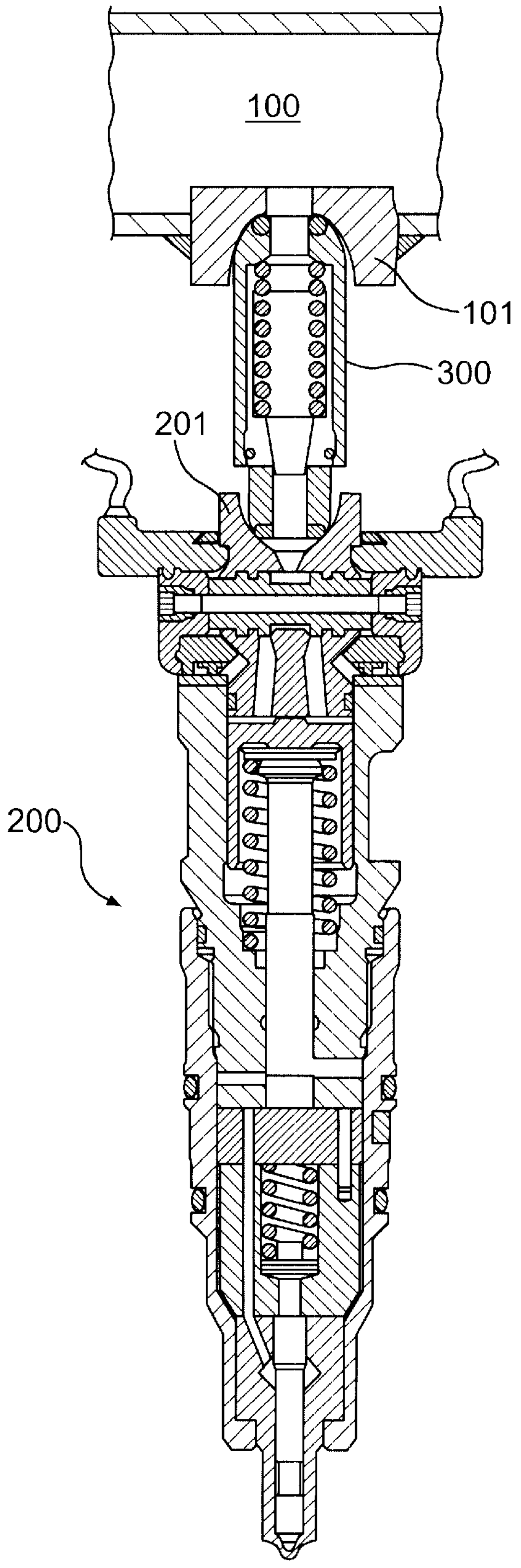
FIG. 1 is a cross-sectional view of the fluid transfer system according to the claimed invention.

Referring to FIG. 1, a fluid rail 100 for hydraulic fluid is shown coupled to a fuel injector 200 by a connector 300. Connector 300 is coupled to fluid rail 100 at outlet 101. Connector 300 is also coupled to the injector 200 at injector inlet 201.

Figure 2:
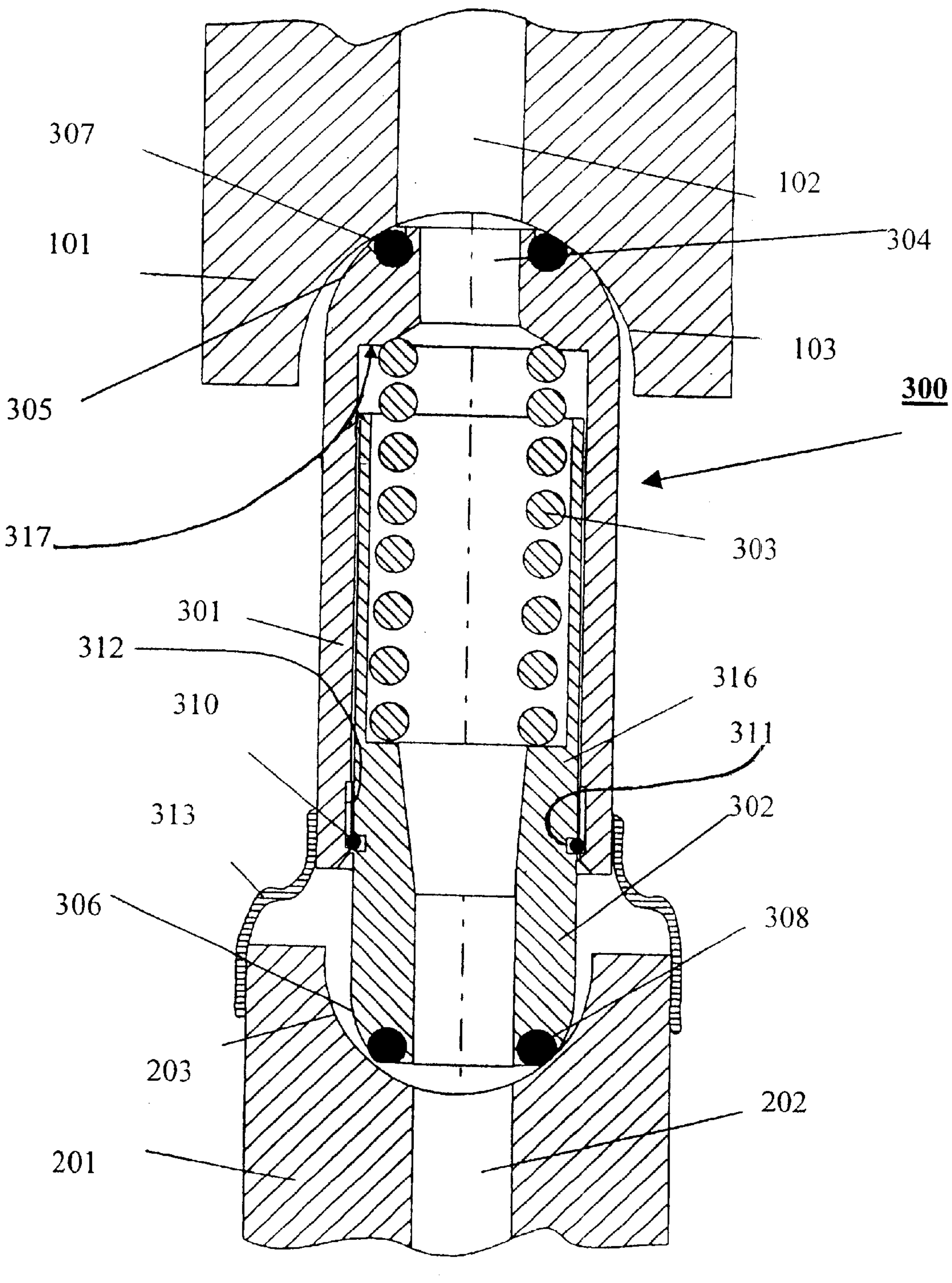
FIG. 2 shows an enlarged cross-sectional view of the connector between the fluid rail and the injector.

Referring to FIG. 2, connector tube 300 comprises of at least two tubes 301 and 302. The tubes 301 and 302 are nested together and are telescopic when urged apart. Alternatively, more than two nested tubes are possible in similar configurations. Although not required, a resilient member 303, for example a spring can be used to urge the two nested tubes 301 and 302 apart. The connector 300 has two distal ends 305 and 306. Each distal end 305 and 306 is provided with sealing members 307 and 308, respectively. Sealing members 307 and 308 can be elastomeric O-rings or metal O-rings. Distal end 305 is disposed in a complementary configuration with curvilinear surface 103 of the fluid rail outlet 101. Distal end 306 is disposed in a complementary configuration with a curvilinear surface 203 of the injector inlet 201. Alternative surface configurations for abutting surfaces 103 and 203 can include conical and frusto-conical surfaces. A retainer 310, for example a polymeric ring, is used to prevent the nested tubes 301 and 302 from being pushed apart by the resilient member 303 prior to assembly. For ease of assembly, a coupler 313 is used to pre-align the connector 300 prior to assembly with fluid rail 101. The coupler can be rubber, metal or preferably plastic.

Fluid rail 101 delivers fluid through outlet passage 102 into tube 302, to tube 301 and into injector inlet passage 202. To reduce any pressure loss between the fluid rail and the injector, the cross sectional area of outlet passage 102 is preferably greater than the cross-sectional area of the inlet passage 304.

The connector 300 is utilized in the following manner. Resilient member 303 is inserted between the tubes 301 and 302. A retainer ring 310 is mounted in groove 311 of tube 302. As tube 302 is telescopically inserted into tube 301, the retainer ring 310 expands radially into groove 312 of tube 301. Tubes 301 and 302 are now fixed in a pre-assembled configuration. A flexible coupling element 313 is mounted to injector inlet 201. Connector 300 is now inserted into flexible coupling element 313, and consequently is coupled to the injector inlet 201. Where the engine requires more than one injector, additional connectors 300 are then inserted into their respective flexible coupling element 313 and injector inlets 201. The fluid rail 100 with outlet(s) 103 is then mated to the respective connector 300. The fluid rail 100 is then fixed to an anchor point (not shown).

Upon pressurization of the fluid rail 100, outlet passage 102, connector passages 314, 315 and inlet passage 202, the tubes 301 and 302 are urged apart by fluid pressure acting on faces 316 and 317. The fluid pressure in the connector 300 causes the ring 310 to decouple from both tubes 301 and 302, thereby allowing the nested tubes 301 and 302 to freely telescope away from each other. Either distal end 305 or 306 is now compressed against its complementary surface at either end due to the pressurized fluid acting on piston surfaces 316 and 317. Sealing members 307 and 308 also assist in forming a tight seal against leakage.

As can be seen by the foregoing, the benefits for using this invention are believed to be twofold: first, the injector and common rail are easily assembled without any special tools; second, by allowing the tubes to expand telescopically under fluid pressure, the connector is self-sealing against leakage. Moreover, it is believed that the complementary surfaces 305 to 103 and 306 to 203 allow the connector 300 to move angularly or obliquely relative to the fluid rail 101 or the injector 201. The movements are believed to allow the connector 300 to absorb vibrations or other motions of the powertrain while maintaining leak-free connections.

While the claimed invention has been disclosed with reference to certain preferred embodiments, numerous modifications, alterations, and changes to the described embodiments are possible without departing from the sphere and scope of the claimed invention, as defined in the appended claims. Accordingly, it is intended that the claimed invention not be limited to the described embodiments, but that it have the full scope defined by the language of the following claims, and equivalents thereof.

What is claimed is:

1. A connector for communicating fluid between a fluid rail and a fuel injector, the connector comprising:

at least two tubular members adapted to be mounted in a telescopic configuration, each tubular member having a groove and an interior surface facing an axis and an exterior surface, the tubular members defining distal ends;

at least one retaining member slidably disposed between edges of one groove of the tubular members and adapted to retain the tubular members in a preset configuration between the edges of the one groove; and at least one resilient member disposed within the interior surfaces of the at least two tubular members.

2. The connector as claimed in claim 1, wherein one end of the distal ends is adapted to be mounted to the fluid rail and the other end is adapted to be mounted to a fuel injector.

3. The connector as claimed in claim 2, wherein each end is at least one of hemispherical, conical or frusto-conical.

4. The connector as claimed in claim 3, further comprising at least one sealing member at each distal end.

5. A connector for communicating fluid between a fluid rail and a fuel injector, the connector comprising:

at least two tubular members adapted to be mounted in a telescopic configuration, each tubular member having an interior surface facing an axis and an exterior surface, the tubular members defining distal ends;

at least one retaining member disposed between the tubular members and adapted to retain the tubular members in a preset configuration; and at least one resilient member disposed within the interior surfaces of the tubular members, the resilient member adapted to urge the tubular members apart.

6. The connector as claimed in claim 1, further comprising a flexible coupling on at least one end of the tubular members.

7. A system for communicating fluid between a fluid rail and an injector, the system comprising a fluid rail:

an injector:

at least two tubular members adapted to be mounted in a nested configuration, each tubular member having an interior surface and being in fluid communication with the fluid rail and the injector, one tubular member having a first groove in the interior surface and another tubular member having a second groove in an exterior surface and in alignment with the first groove, the second groove positionable between edges of the first groove;

at least one retaining member disposed in the second groove and moveable between the edges of the first groove of the tubular members and adapted to retain the tubular members in a preset configuration between the edges of the first groove; and at least one resilient member disposed within the interior surfaces of the at least two tubular members.

8. The system as claimed in claim 7, wherein one distal end of the tubular members contiguously abuts the fluid rail.

9. The system as claimed in claim 8, further comprising at least a seal disposed on one distal end.

10. The system as claimed in claim 7, wherein another distal end of the tubular members contiguously abuts the injector.

11. The system as claimed in claim 10, further comprising at least a seal disposed on the another distal end.

12. The system as claimed in claim 7, wherein the tubular members are adapted to be urged apart.

13. The system as claimed in claim 7, further comprising a coupling disposed between at least one distal end and one of the fluid rail and the injector.

14. A method of transferring fluid between a fluid rail and a fuel injector, the method comprising:

providing at least two tubular members disposed telescopically to each other, each tubular member having an interior surface facing an axis and an exterior surface, the tubular members defining distal ends;

retaining the tubular members in a preset configuration using a retaining member which is disposed between two opposing grooves on the interior surface and the exterior surface;

transferring hydraulic fluid between one distal end to the other distal end; and providing at least one resilient member disposed within the interior surfaces of the tubular members for urging the tubular members apart.

15. The method as claimed in claim 14, wherein the step of urging comprises a resilient member disposed between the tubular members.

16. The method as claimed in claim 14, wherein the step of urging comprises urging the tubular members apart by fluid disposed therein.

17. The method as claimed in claim 14, further providing at least a sealing member at each distal end.

18. A method of transferring fluid between a fluid rail and a fuel injector, the method comprising:

providing at least two tubular members disposed in an opposed relation to each other, each tubular member having an interior surface facing an axis and an exterior surface, the tubular members defining distal ends;

retaining the tubular members in a preset configuration using a retaining member which is disposed between two opposing grooves on the interior surface and the exterior surface;

coupling one distal end to a fluid rail;

coupling another distal end to the fuel injector; and providing at least one resilient member disposed within the interior surfaces of the at least two tubular members for urging the tubular members apart to form respective seals for the distal ends between the edges of one of the opposing grooves.

19. The method as claimed in claim 18, further providing a coupling element between at least one of the distal ends and at least one of the fluid rail and the fuel injector.

20. The method as claimed in claim 18, further providing a resilient element between the tubular members.

21. The system as claimed in claim 1, wherein:

the groove on each tubular member is defined as:

a first groove on the interior of one tubular member, and a second groove on the exterior surface of the other tubular member nestled between edges of the first groove; and the at least one retaining member slidably disposed between the edges of first groove to perform the telescopic operations.

22. A method of transferring fluid between a fluid rail and a fuel injector, the method comprising:

providing at least two tubular members disposed telescopically to each other, each tubular member having an interior surface facing an axis and an exterior surface, the tubular members defining distal ends;

retaining the tubular members in a preset configuration;

transferring hydraulic fluid between one distal end to the other distal end; and providing at least one resilient member disposed within the interior surfaces of the tubular members for urging the tubular members apart and further urging the tubular members apart with the pressurization of the hydraulic fluid being transferred between the one distal end to the other distal end.

* * * * *